US011168995B2

(12) United States Patent
Ludwick et al.

(10) Patent No.: US 11,168,995 B2
(45) Date of Patent: Nov. 9, 2021

(54) MANAGING A FLEET OF VEHICLES

(71) Applicant: Waymo LLC, Mountain View, CA (US)

(72) Inventors: Christopher Kennedy Ludwick, Los Altos, CA (US); Andrew Hughes Chatham, San Francisco, CA (US); Matthew Paul McNaughton, Mountain View, CA (US); Charles Bigelow Johnson, Atherton, CA (US)

(73) Assignee: Waymo LLC, Mountain View, CA (US)

( * ) Notice: Subject to any disclaimer, the term of this patent is extended or adjusted under 35 U.S.C. 154(b) by 451 days.

(21) Appl. No.: 15/921,907

(22) Filed: Mar. 15, 2018

(65) Prior Publication Data

US 2019/0285425 A1   Sep. 19, 2019

(51) Int. Cl.
*G01C 21/34* (2006.01)
*G07C 5/00* (2006.01)
*G08G 1/00* (2006.01)
*G05D 1/02* (2020.01)
*B60L 58/12* (2019.01)

(52) U.S. Cl.
CPC .......... *G01C 21/3469* (2013.01); *B60L 58/12* (2019.02); *G01C 21/343* (2013.01); *G05D 1/0291* (2013.01); *G07C 5/008* (2013.01); *G08G 1/20* (2013.01)

(58) Field of Classification Search
None
See application file for complete search history.

(56) References Cited

U.S. PATENT DOCUMENTS

| 6,498,454 | B1 * | 12/2002 | Pinlam | H01M 10/44 320/107 |
| 6,850,898 | B1 | 2/2005 | Murakami et al. | |
| 9,148,027 | B2 * | 9/2015 | Shane | B60L 58/12 |
| 9,317,086 | B2 | 4/2016 | Sellschopp | |
| 10,065,517 | B1 * | 9/2018 | Konrardy | B60R 25/255 |
| 2012/0109409 | A1 | 5/2012 | Tetsuo | |
| 2012/0200260 | A1 * | 8/2012 | Karner | B60L 53/68 320/109 |

(Continued)

FOREIGN PATENT DOCUMENTS

| KR | 20130119811 A | 11/2013 | |
| WO | WO-2013045449 A2 * | 4/2013 | B60L 53/63 |
| WO | 2013116767 A1 | 8/2013 | |

OTHER PUBLICATIONS

International Search Report and Written Opinion for Application No. PCT/US2019/022006.

(Continued)

*Primary Examiner* — David P. Merlino
(74) *Attorney, Agent, or Firm* — Botos Churchill IP Law

(57) ABSTRACT

Aspects of the disclosure relate to determining a next vehicle task for a vehicle of a fleet. Vehicle data from the vehicle, charger data about at least one charger, and demand data may be received and used to determine the next vehicle task. The vehicle may be directed to the next vehicle task. Determining a next vehicle task may further be based on predictions made using the vehicle data, the charger data, and the demand data. Heuristics may also be used in determining a next vehicle task.

22 Claims, 12 Drawing Sheets

(56) References Cited

U.S. PATENT DOCUMENTS

| | | | |
|---|---|---|---|
| 2013/0179057 A1* | 7/2013 | Fisher | G01C 21/3492 |
| | | | 701/117 |
| 2016/0129592 A1 | 5/2016 | Saboo et al. | |
| 2016/0247106 A1 | 8/2016 | Dalloro et al. | |
| 2017/0123421 A1* | 5/2017 | Kentley | B60W 30/00 |
| 2017/0192437 A1 | 7/2017 | Bier et al. | |
| 2018/0201148 A1* | 7/2018 | Donnelly | H02J 7/025 |
| 2018/0222340 A1* | 8/2018 | Zhao | B60L 53/66 |
| 2018/0307226 A1* | 10/2018 | Chase | B60L 53/68 |
| 2018/0373268 A1* | 12/2018 | Esteves | G05D 1/0291 |
| 2019/0011931 A1* | 1/2019 | Selvam | G06Q 50/30 |
| 2019/0107406 A1* | 4/2019 | Cox | G01C 21/3679 |
| 2019/0126769 A1* | 5/2019 | Schmalzried | G08G 5/0069 |
| 2019/0178662 A1* | 6/2019 | Son | B60W 20/12 |
| 2019/0205842 A1* | 7/2019 | Stams | B60L 53/65 |
| 2019/0275892 A1* | 9/2019 | Williams | B60L 53/64 |
| 2020/0139842 A1* | 5/2020 | Logvinov | B60L 53/67 |
| 2020/0160476 A1* | 5/2020 | Ramot | H04W 4/024 |
| 2020/0160478 A1* | 5/2020 | Ramot | G08G 1/127 |
| 2021/0056483 A1* | 2/2021 | Kajiwara | H04W 4/023 |

OTHER PUBLICATIONS

Burns, Lawrence, et al., "Transforming Personal Mobility", The Earth Institute, (2013), 43 pgs.

Fagnant, Daniel and Kockelman, Kara, "The Travel And Environmental Implications of Shared Autonomous Vehicles, Using Agent-Based Model Scenarios", (2014), 22 pgs.

Fagnant, Daniel, et al., "Operations of a Shared Autonomous Vehicle Fleet for the Austin, Texas Market", (2015), 17 pgs.

Fagnant, Daniel and Kockelman, Kara, "Development & Application of a Network-Based Shared Autonomous Vehicle Model for Austin, Texas", (2014), 14 pgs.

Fagnant, Daniel and Kockelman, Kara, "Dynamic Ride-Sharing and Fleet Sizing for a System of Shared Autonomous Vehicles in Austin, Texas", (2015), 17 pgs.

Marczuk, Katarzyna, et al., "Autonormous Mobility on Demand in Simmobility: Case Study of the Central Business District in Singapore", (2015), 6 pgs.

Chen, T. Donna, et al., "Operations of a Shared, Autonomous, Electric Vehicle Fleet: Implications of Vehicle & Charging Infrastructure Decisions", (2016), 20 pgs.

Chen, T. Donna and Kockelman, Kara M., "Management of a Shared, Autonomous, Electric Vehicle Fleet Implications of Pricing Schemes", (2016), 21 pgs.

Loeb, Benjamin and Kockelman, Kara M., "Fleet Performance and Cost Evaluation of a Shared Autonomous Electric Vehicle Fleet: A Case Study for Austin, Texas", (2017), 16 pgs.

* cited by examiner

| Vehicle ID | Vehicle Location | Vehicle Type ||| Vehicle Charge Status | Vehicle Charge Capacity | Current Vehicle Task |
|---|---|---|---|---|---|---|---|
| | | Fuel | Size | Operation | | | |
| 100 | [x1, y1] | Electric | Sedan 5 passengers | Autonomous | 50% | 90 kWh | On trip [4 passenger, carpool, 2 destinations] |
| 100A | [x2, y2] | Hybrid | Minivan 8 passengers | Semi-autonomous | 70% | 30 kWh | Charging |
| 100B | [x3, y3] | Gasoline | Bus 20 passengers | Human driver | 100% | 35 gallons | Power off |
| 100C | [x4, y4] | Fuel Cell | Compact 5 passengers | Autonomous | 10% | 165 kWh | Idle |

500A
FIGURE 5A

| Charger ID | Charger Location | Charger Availability | Charger Type ||| Charger Hours of Operation |
| --- | --- | --- | --- | --- | --- | --- |
| | | | Fuel | Speed | Accessories | |
| 400 | [x5, y5] | Currently available | Electric | Level 2 | Automated connectors | 9 am – 10 pm |
| 400A | [x6, y6] | Temporarily unavailable | Electric | Level 3 | Inductive; automated connectors | 8 am – 8 pm |
| 400B | [x7, y7] | Out of service | Gasoline | n/a | n/a | 24 hours |
| 400C | [x8, y8] | Currently available | Fuel Cell | n/a | n/a | 24 hours |

500B
FIGURE 5B

| User ID | Trip Status | Service Type | Number of Passengers | Trip Pickup Locations | Trip Destinations | Trip Estimated Time of Arrival | User Requested Vehicle Type | | |
|---|---|---|---|---|---|---|---|---|---|
| | | | | | | | Fuel | Size | Operation |
| 322 | Requested | Taxi | 4 passengers | [x10, y10] | [x11, y11] | 10 min | Electric | Sedan | Autonomous |
| 332 | Requested | Taxi | 1 passenger | [x12, y12] | [x13, y13] | 5 min | Hybrid | Minivan | Semi-autonomous |
| 342 | On trip | Taxi | 2 passengers | [x14, y14] | [x15, y15] | 15 min | Electric | Compact | Semi-autonomous |
| 352 | On trip | Carpool | 2 passengers | [x16, y16]<br>[x18, y18] | [x17, y17]<br>[x19, y19] | 20 min | Fuel Cell | Compact | Autonomous |

MANAGING A FLEET OF VEHICLES

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. Thus, such vehicles may be used to provide transportation services.

Other systems which provide transportation services typically include drivers or conductors who are tasked with making decisions about how to operate vehicles. Such services may include some backend server systems which can dispatch vehicles to certain locations to provide transportations services as well as provide fleet management and vehicle staging instructions.

BRIEF SUMMARY

The present disclosure provides a method of determining a next vehicle task for a vehicle of a fleet, comprising receiving, from the vehicle, vehicle data including one or more of a vehicle charge status, a vehicle charge capacity, a vehicle location, a vehicle type, and a current vehicle task; receiving charger data about at least one charger, the charger data including one or more of a charger location, a charger availability, a charger type, and a charger speed; receiving demand data about one or more of a current trip demand and a predicted future trip demand; determining a next vehicle task for the vehicle based on the vehicle data, the charger data, and the demand data, wherein the next vehicle task relates to charging the vehicle; and directing the vehicle to the next vehicle task.

The method may further comprise determining an energy consumption rate of the vehicle and predicting a future vehicle charge status after a trip based on the energy consumption rate, wherein directing the vehicle to the next vehicle task includes directing the vehicle to recharge after the trip when the predicted vehicle charge status after the trip is below a threshold minimum. The energy consumption rate may be determined further based on weather conditions. The method may further comprise determining whether the vehicle charge status is below a threshold absolute minimum, wherein directing the vehicle to the next vehicle task includes directing the vehicle to recharge when the vehicle charge status is determined to be below the threshold absolute minimum level.

The method may further comprise predicting a likelihood that a current energy cost will be lower than a future energy cost, wherein determining a next vehicle task is further based on the likelihood that a current energy cost will be lower than a future energy cost. The method may further comprise determining one or more time windows with peak energy costs, wherein directing the vehicle to the next vehicle task includes directing the vehicle not to recharge during the one or more time windows with peak energy costs.

The method may further comprise selecting a suitable charger amongst the at least one charger for recharging the vehicle based on at least one of the vehicle location, the vehicle type, the charger location, the charger availability, the charger type, and the charger speed, and wherein directing the vehicle to the next vehicle task includes directing the vehicle to recharge at the suitable charger, when the next vehicle task is determined to be recharge. The selecting a suitable charger may further be based on needs of other vehicles in the fleet to recharge. The selecting a suitable charger may further be based on a distribution of where other vehicles in the fleet are recharging. The method may further comprise predicting a future charger availability based on the charger availability, the charger type, and the charger speed, wherein selecting a suitable charger is further based on the future charger availability.

The method may further comprise determining an extent to recharge the vehicle based on at least one of the vehicle charge status, the vehicle charge capacity, and the charger speed; and directing the vehicle to continue recharge up to the extent, and wherein directing the vehicle to the next vehicle task includes directing the vehicle to stop recharge when the vehicle is recharged up to the extent. The determining the extent to recharge may further be based on whether the vehicle charge status exceeds a threshold maximum level. The method may further comprise adjusting the threshold maximum level when the current trip demand is above a threshold peak demand. The determining the extent to recharge may further be based on whether the vehicle charge status falls below a threshold minimum level, wherein the threshold minimum level is based on a cost of traveling involved to reach a charger for recharge. The determining the extent to recharge the vehicle may further be based on a comparison between a current energy cost and a predicted future energy cost.

The method may further comprise determining a suitable next trip based on at least one of the vehicle type, a service type, and a number of passengers, and wherein directing the vehicle to the next vehicle task includes directing the vehicle to service the suitable next trip and to recharge after the suitable next trip.

The method may further comprise predicting a first vehicle location after the current vehicle task, predicting a second vehicle location after a next trip based on the demand data, and predicting a likelihood that the vehicle will be closer to an available charger upon completing the current vehicle task thin upon completing the next trip, wherein determining the next vehicle task is further based on the likelihood that the vehicle will be closer to an available charger upon completing the current vehicle task than upon completing the next trip.

The disclosure further provides for a system for determining a next vehicle task for a vehicle of a fleet, comprising one or more processors of one or more server computing devices, the one or more processors being configured to receive vehicle data about a vehicle in a fleet, the vehicle data including one or more of a vehicle charge status, a vehicle charge capacity, a vehicle location, a vehicle type, and a current vehicle task; receive charger data about at least one charger, the charger data including one or more of a charger location, a charger availability, a charger type, and a charger speed; receive demand data about one or more of a current trip demand and a predicted future trip demand; determine a next vehicle task for the vehicle based on the vehicle data, the charger data, and the demand data, wherein the next vehicle task relates to charging the vehicle; and direct the vehicle to the next vehicle task. The one or more processors may further be configured to determine an energy consumption rate of the vehicle and predict a future vehicle charge status after a trip based on the energy consumption rate, wherein directing the vehicle to the next vehicle task includes directing the vehicle to recharge after the trip when the predicted vehicle charge status after the trip is below a threshold minimum. The system may further comprise the vehicle.

BRIEF DESCRIPTION OF THE DRAWINGS

FIGS. 5A-5C are example tables in accordance with aspects of the disclosure.

DETAILED DESCRIPTION

Overview

Figure 1:
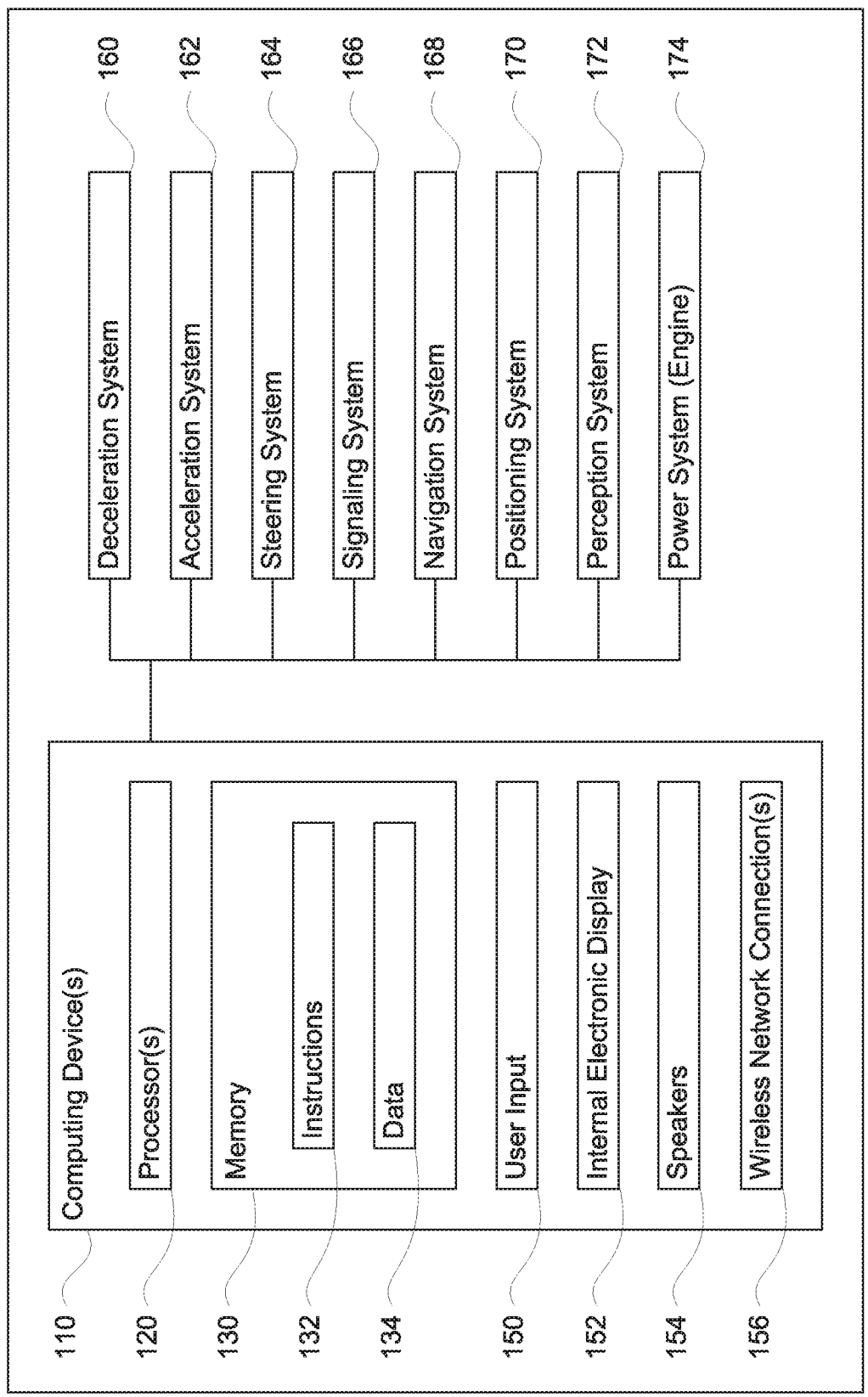
FIG. 1 is a functional diagram of an example vehicle in accordance with an exemplary embodiment.

The technology relates to systems and methods of directing a fleet of vehicles. For instance, a server system may be configured as a dispatch system to determine a next vehicle task for a vehicle in the fleet based on vehicle data, charger data, and demand data. The vehicle tasks may include, but me not limited to, recharging, continuing to recharge, stopping recharging, powering off, or servicing a next trip. The vehicle data may include various types of information about a vehicle in the fleet. For example, the vehicle data may include a vehicle location and a vehicle type, which may be categorized by how energy is consumed, its size or passenger capacity, or how the vehicle is being driven. In some instances, the vehicle data may include information about the vehicle's charge status ad charge capacity. The vehicle data may also include information about a current vehicle task. The charger data may include information on various chargers that the vehicles in the fleet may use. The demand data may indicate demands for trips by the vehicles of the fleet.

The dispatch system may make predictions based on the vehicle data. In addition to the vehicle data, the dispatch system may also use other factors to predict the energy consumption rate of the vehicle, such as mute conditions, weather conditions, or a predicted likelihood that a user may modify a trip. In addition to using the vehicle data, the dispatch system may also make predictions based on the charger data. Similarly, the dispatch system may make predictions based on the demand data.

The dispatch system may use the vehicle data, the charger data, the demand data, and predictions in combination with heuristic data to determine a next vehicle task for the vehicle, which may include recharging, continue recharging, stop recharging powering off, or servicing a next trip. For example, as a safety measure, the dispatch system may use a heuristic that identifies a threshold absolute minimum such that the vehicle must be directed to recharge once the threshold absolute minimum is reached. In other embodiments, heuristics may be designed based on predictions of a likelihood that the vehicle will be closer to an available charger upon completing the current trip than upon completing the next trip. In other embodiments, heuristics may be designed based on predictions of energy cost. In still other embodiments, heuristics may be designed to determine a suitable charger, if the next vehicle task is determined to be recharge. Other embodiments may have heuristics designed to determine an extent to recharge the vehicle. In other embodiments, heuristics may be designed to determine a suitable trip, if the next vehicle task is to service a trip. In still other embodiments, heuristics may be designed as fleet-wide rules.

The fleet directing technology described herein may allow for the optimization of scheduling of vehicle tasks for a fleet of vehicles used to provide transportation services. This, in turn, may minimize empty mileage traveled by the vehicles in the fleet (in other words, miles traveled by vehicles when not transporting passengers or cargo), minimize lost trips, as well as reduce energy coast for the fleet. Further, the technology may also improve users' experience with the transportation services, for example, fewer empty miles traveled may mean shorter wait-times for users, fewer lost trips may mean that the requesting user is less likely to be disappointed by a declined trip request, and reduced energy coat for the fleet may allow the transportation services to be offered at more affordable prices.

Example Systems

As shown in FIG. 1, a vehicle 100 in accordance with one aspect of the disclosure includes various components. While certain aspects of the disclosure me particularly useful in connection with specific types of vehicles, the vehicle may be any type of vehicle including, but not limited to, cars, trucks, motorcycles, buses, recreational vehicles, etc. The vehicle may have a certain passenger capacity, for example, a minivan with up to 8 passengers, a sedan with up to five passengers, a bus with up to twenty passengers, a compact with up to five passengers, etc. The vehicle may be autonomous, semi-autonomous, or driven by a human driver. The vehicle may be an electric vehicle, a hybrid vehicle, a gasoline vehicle, a fuel cell vehicle, etc.

The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instruction and data are stored an different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein.

The instructions may be stored in object code format for direct processing by the processor, or in any other computing device language including scripts or collections of independent source code modules that are interpreted on demand or compiled in advance. Functions, methods and routines of the instructions e explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network compactions 156 to facilitate communication with other computing devices, such as the client computing devices and server computing devices described in detail below. The wireless network connections may include short range commination protocols such as Bluetooth, Bluetooth low energy (LE), cellular connection, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be control computing devices of an autonomous or semi-autonomous driving computing system incorporated into vehicle 100. The autonomous or semi-autonomous driving computing system may be capable of communicating with various components of the vehicle in order to control the movement of vehicle 100 according to primary vehicle control code of memory 130. For example, returning to FIG. 1, computing devices 110 may be in commination with various systems of vehicle 100, such as deceleration system 160, acceleration system 162, steering system 164, signaling system 166, navigation system 168, positioning system 170, perception system 172, and power system 174 (i.e. the vehicle's engine or motor) in order to control the movement, speed, etc. of vehicle 100 in accordance with the instruction 132 of memory 130. The power system 174 may run on any of a number of different fuels. For example, the power system 174 may be powered by a battery, by a fuel cell, by a gasoline tank, or it may be a hybrid power system. The power system 174 may further include a charging system for a battery or a fuel cell. Again, although these systems are shown as external to computing devices 110, in actuality, these systems may also be incorporated into computing devices 110, again as a autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Navigation system 168 may be used by computing devices 110 in order to determine and follow a route to a location. In this regard, the navigation system 168 and/or data 134 may store detailed map information, e.g., highly detailed maps identifying the shape and elevation of roadways, lane lines, intersection, crosswalks, speed limits, traffic signals, buildings, signs, real time traffic information, vegetation, or other such objects and information.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include m absolute geographical location, such as latitude, longitude, and altitude as well as relative location information, such as location relative to other cars immediately around it which can often be determined with less noise that absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

Figure 2:
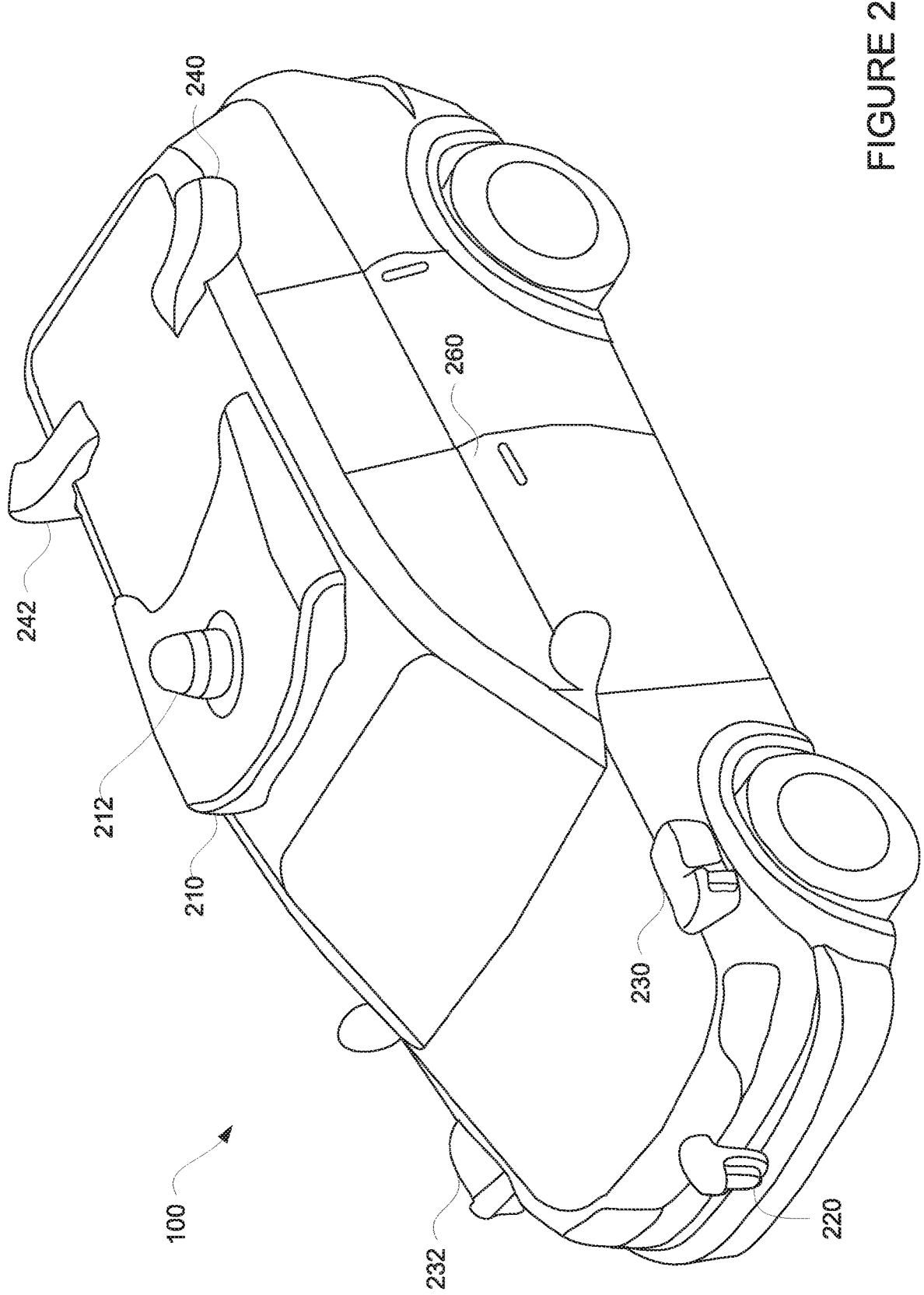
FIG. 2 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or my other detection devices that record data which may be processed by computing device 110. In the case where the vehicle is a passenger vehicle such as a minivan, the minivan may include a laser or other sensors mounted on the roof or other convenient location. For instance, FIG. 2 is an example external view of vehicle 100. In this example, roof-top housing 210 and dome housing 212 may include a lidar sensor as well as various cameras and radar units. In addition, housing 220 located at the front end of vehicle 100 and housings 230, 232 on the driver's and passenger's sides of the vehicle may each store a lidar sensor. For example, housing 230 is located in front of driver door 260. Vehicle 100 also includes housings 240, 242 for radar units and/or cameras also located on the roof of vehicle 100. Additional radar units and cameras (not shown) may be located at the front and rear ends of vehicle 100 and/or on other positions along the roof or roof-top housing 210.

The computing devices 110 may control the direction and speed of the vehicle by controlling various components. By way of example, computing devices 110 may navigate the vehicle to a destination location completely autonomously using data from the detailed map information and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 3:
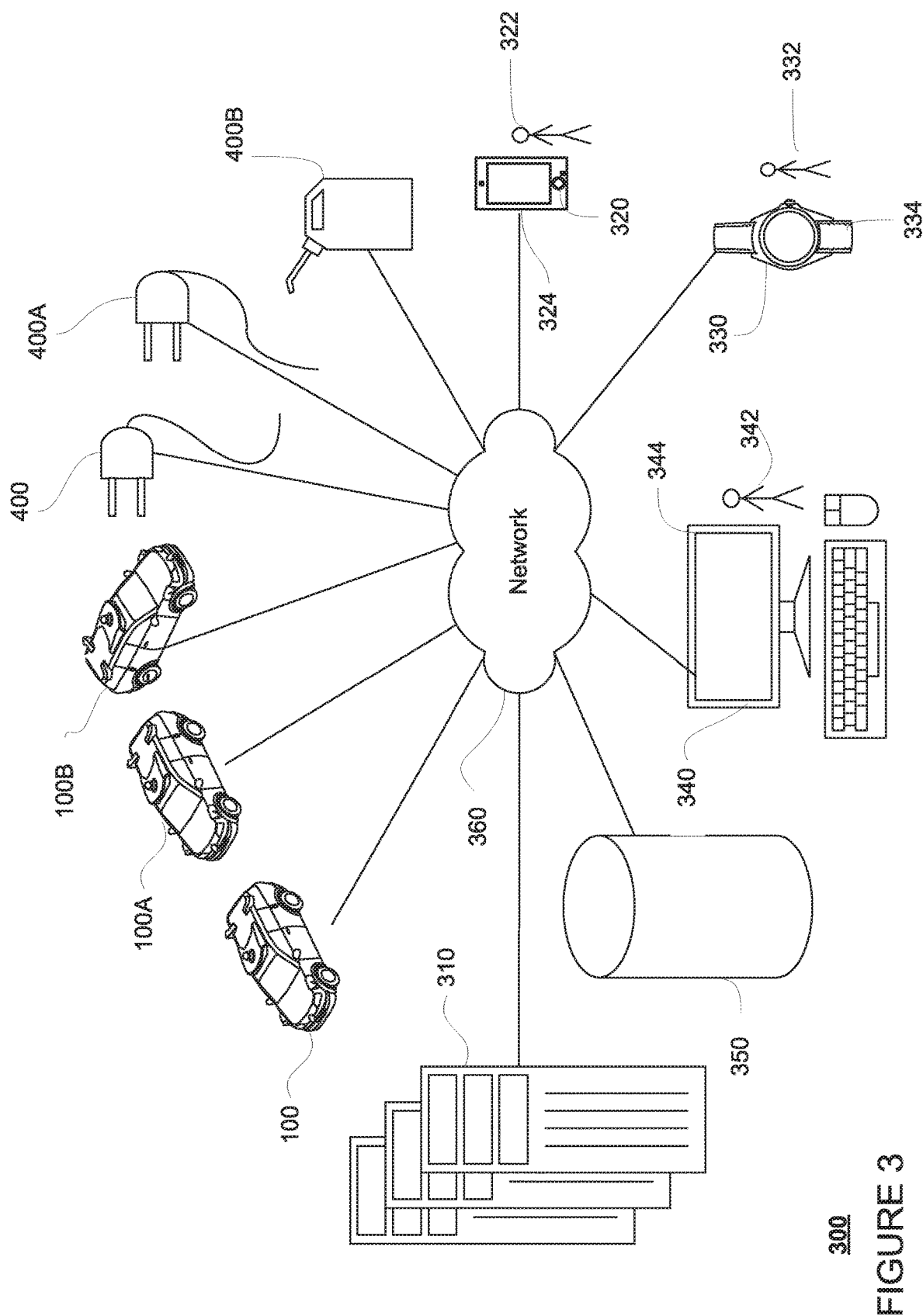
FIG. 3 is a pictorial diagram of an example system in accordance with an exemplary embodiment.
Figure 4:
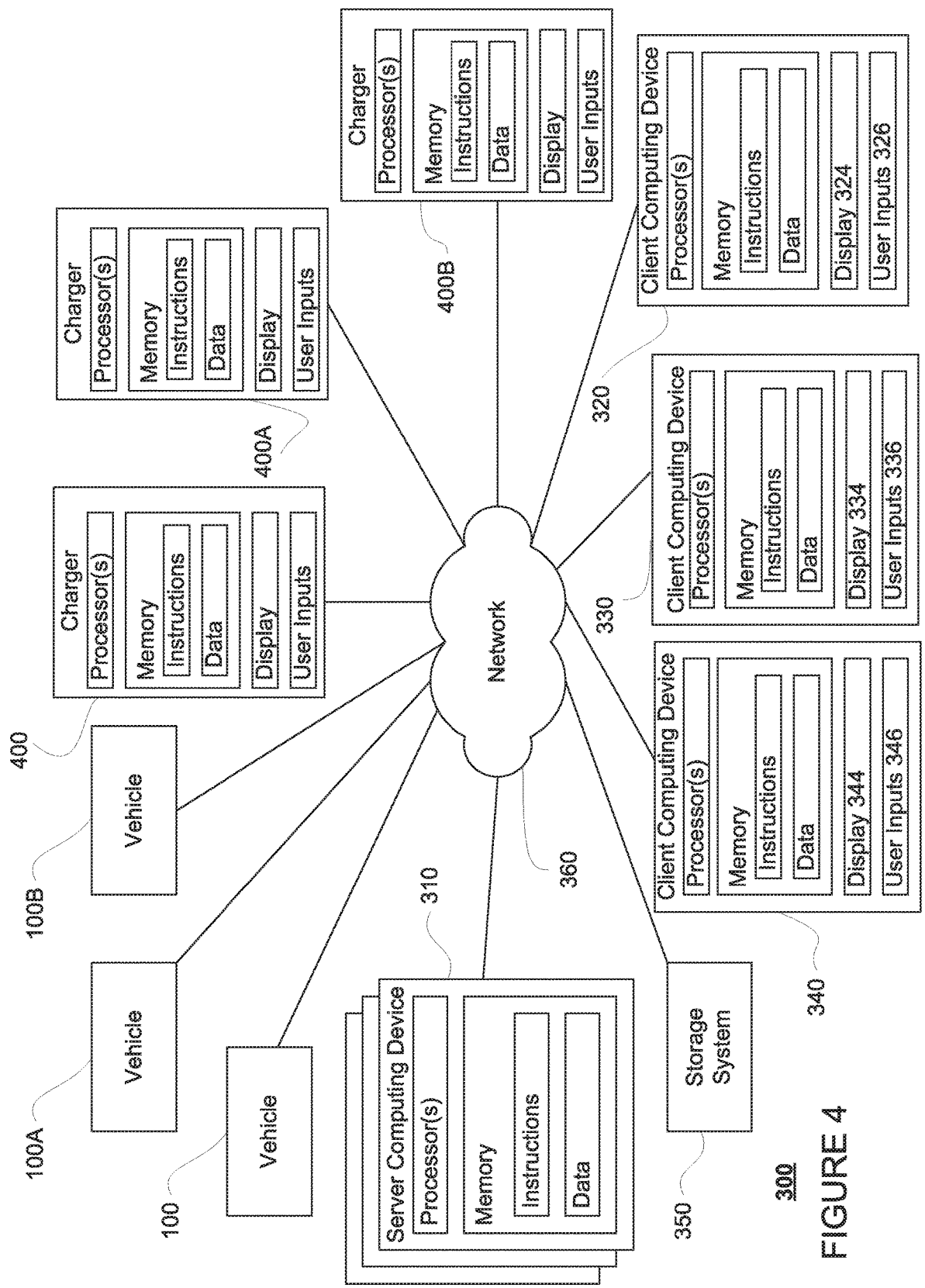
FIG. 4 is a functional diagram of the system of FIG. 3 in accordance with aspects of the disclosure.

Computing device 110 of vehicle 100 may also receive or transfer information to and from other computing devices, such as those computing devices that are a part of the transportation service as well as other computing devices. FIGS. 3 and 4 are pictorial and functional diagrams, respectively, of an example system 300 that includes a plurality of computing devices 310, 320, 330, 340 and a storage system 350 connected via a network 360. System 300 also includes vehicle 100, and vehicles 100A, 100B which may be configured the same as or similarly to vehicle 100. System 300 further includes chargers 400, 400A, 400B, which may be used by vehicles in the fleet. Although only a few vehicles, chargers, and computing devices me depicted for simplicity, a typical system may include significantly more.

As shown in FIG. 4, each of computing devices 310, 320, 330, 340, as well as chargers 400, 400A, 400B may include one or more processors, memory, data and instructions. Such processors, memories, data and instruction may be configured similarly to one or more processors 120, memory 130, instructions 132, and data 134 of computing device 110.

The network 360, and intervening nodes, may include various configurations and protocols including short range communication protocols such as Bluetooth, Bluetooth LE, the Internet, World Wide Web, Internet, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 310 may include one or more server computing devices having a plurality of computing devices, e.g., a load balanced server farm, that exchange information with different nodes of a network for the purpose of receiving, processing and transmitting the data to and from other computing devices. For instance, one or more computing devices 310 may include one or more server computing devices that are capable of communicating with computing device 110 of vehicle 100 or a similar computing device of vehicle 100A, 100B, with chargers 400, 400A, 400B, as well as with computing devices 320, 330, 340 via the network 360. For example, vehicles 100, 100A, 100B may be a part of a fleet of vehicles that can be dispatched by server computing devices to various locations. For example, chargers 400, 400A, and 400B may be some of the chargers available for use by the fleet of vehicles dispatched by the server computing devices. In this regard, the server computing devices 310 may function as a dispatch system.

As described in more detail below, the server computing devices 310 may be configured to receive, update and use the vehicle data, the charger data, and demand data to make predictions, and determine a next vehicle task for the vehicles in the fleet. The vehicle tasks may include, but are not limited to, recharging, continuing to recharge, stopping recharging, powering off, or servicing a next trip. The server computing devices 310 may be further configured to determine a next vehicle task based on heuristics. The server computing devices 310 may be configured to direct each of the vehicles in the fleet to a respective next vehicle task.

In addition, server computing devices 310 may use network 360 to transmit and present information to a user, such as user 322, 332, 342 on a display, such as displays 324, 334, 344 of computing devices 320, 330, 340. In this regard, computing devices 320, 330, 340 may be considered client computing devices. A user, such as user 322, 332, 342, may also transmit information to the server computing devices 310. For example, computing devices 320, 330, 340 may be used to send a trip request to the server computing devices 310.

As shown in FIG. 4, each client computing device 320, 330, 340 may be a personal computing device intended for use by a user 322, 332, 342, and have all of the components normally used in connection with a personal computing device including a one or more processors (e.g., a central processing unit (CPU)), memory (e.g., RAM and internal hard drives) storing data and instructions, a display such as displays 324, 334, 344 (e.g., a monitor having a screen, a touch-screen, a projector, a television, or other device that is operable to display information), and user input devices 326, 336, 346 (e.g., a mouse, keyboard, touchscreen or microphone). The client computing devices may also include a camera for recording video streams, speakers, a network interface device, and all of the components used for connecting these elements to one another.

Although the client computing devices 320, 330, and 340 may each comprise a full-sized personal computing device, they may alternatively comprise mobile computing devices capable of wirelessly exchanging data with a server over a network such as the internet. By way of example only, client computing device 320 may be a mobile phone or a device such as a wireless-enabled PDA, a tablet PC, a wearable computing device or system, or a netbook that is capable of obtaining information via the Internet or other networks. In another example, client computing device 330 may be a wearable computing system, shown as a wristwatch as shown in FIG. 3. As an example the user may input information using a small keyboard, a keypad, microphone, using visual signals with a camera, or a touch screen.

As also shown in FIG. 4, each charger 400, 400A, 400B may have all of the components normally used in connection with a computing device including a one or more processors (e.g., a central processing unit (CPU)), memory (e.g., RAM and internal hard drives) storing data and instructions, a display (e.g., a monitor having a screen, a touch-screen, a projector, a television, or other device that is operable to display information), and user input devices (e.g., a mouse, keyboard, touchscreen or microphone). The charger may also include a camera, speakers, a network interface device, and all of the components used for connecting these elements to one mother.

As with memory 130, storage system 350 can be of my type of computerized storage capable of storing information accessible by the server computing devices 310, such as a hard-drive, memory card, ROM, RAM, DVD, CD-ROM, write-capable, and read-only memories. In addition, storage system 350 may include a distributed storage system where data is stored on a plurality of different storage devices which may be physically located at the same or different geographic locations. Storage system 350 may be connected to the computing devices via the network 360 as shown in FIGS. 3 and 4, and/or may be directly connected to or incorporated into any of the computing devices 110, 310, 320, 330, 340, or chargers 400, 400A, 400B, etc.

Storage system 350 may store various types of information, including the vehicle data, the charger data, and the demand data as described in more detail below. This information may be retrieved or otherwise accessed by a server computing device, such as one or more server computing devices 310, in order to perform some or all of the features described herein. For instance, storage system 350 may store vehicle data on each vehicle of the fleet, charger data of various chargers that the fleet may use, as well as demand data. As discussed further below, FIG. 5A is an example table for tracking the vehicles of the fleet FIG. 5B is an example table for tracking the chargers that can be used by the fleet. FIG. 5C is an example table for tracking demand for service by the fleet.

The vehicle data may include various types of information about a vehicle in the fleet. FIG. 5A is a table 500A showing some example vehicle data that may be sent from vehicles 100, 100A, 100B, and 100C. As shown in the table, the vehicle data may include a vehicle location, such as the vehicle's GPS coordinates, for example, vehicle 100 is at GPS coordinates [x1, y1], vehicle 100A is at GPS coordinates [x2, y2], vehicle 100B is at GPS coordinates [x3, y3], and vehicle 100C is at GPS coordinates [x4, y4]. The vehicle data may include vehicle type, which may be categorized by how energy is consumed, for example, vehicle 100 is an electric vehicle, vehicle 100A is a hybrid vehicle, vehicle 100B runs n gasoline, and vehicle 100C is a fuel cell vehicle. The vehicle may also be categorized by its size or passenger capacity, for example, vehicle 100 is a sedan with a capacity of up to five passengers, vehicle 100A is a minivan with a capacity of up to eight passengers, vehicle 100B is a bus with a capacity of up to twenty passengers, and vehicle 100C is a compact vehicle with a capacity of up to five passengers. The vehicle may also be categorized by how the vehicle is being driven, for example, vehicle 100 and 100C are autonomous, vehicle 100A is semi-autonomous, and vehicle 100B is operated by a human driver. In some instances, the vehicle data may include information about the vehicle's charge status, for example, vehicle 100 is half charged at 50%, vehicle 100A is 70% charged, vehicle 100B is fully charged at 100%, and vehicle 100C is 10% charged. The vehicle data may also include the vehicle's charge capacity, for example, vehicle 100 has a battery size of 90 kWh, vehicle 100A has a battery size of 30 kWh, vehicle 100B has a fuel tank size of 35 gallons, and vehicle 100C has a fuel cell size of 165 kWh. The vehicle data may also include a current vehicle task, for example, vehicle 100 is servicing a trip, vehicle 100A is charging, vehicle 100B is powered off, and vehicle 100C is idling. The current vehicle task may further specify service type and number of passengers, for example, vehicle 100 is currently performing a task including a carpool with four passengers and two destinations.

The charger data may include information on various chargers that the vehicles in the fleet may use. FIG. 5B is a table 500B showing some example charger data that may be sent from chargers 400, 400A, 400B, and 400C. As shown in the table, the charger data for a charger may include a charger location, such as the charger's GPS coordinates, for example, charger 400 is at GPS coordinates [x5, y5], charger 400A is at GPS coordinates [x6, y6], charger 400B is at GPS coordinates [x7, y7], and charger 400C is at GPS coordinates [x8, y8]. The charger data may include the charger's availability for use, for example, chargers 400 and 400C are currently available, charger 400A is temporally unavailable, and charger 400B is out of service. The charger data may include a charger type, for example, chargers 400 and 400A re electric chargers, charger 400C is a fuel cell charger, and charger 400B is a gas station. The charger type may further specify, for example, for an electric charger, such as chargers 400 and 400A, whether inductive charging is enabled, such as charger 400A, and whether automated connectors e enabled, such as both chargers 400 and 400A. The charger data may include a charger speed, for example, for an electric charger, charger 400 is Level 2 (240 V AC, slow), charger 400A is Level 3 (fast charger), though not shown in FIG. 5A here, an electric charger may also be Level 1 (household outlet style, slow). The charger data may further include hours of operation for public chargers, for example, charger 400's hours of operation are 9 am-10 pm, charger 400A's hours of operation are 8 am-8 pm, and chargers 400B and 400C re both open 24 hours.

Figure 6:
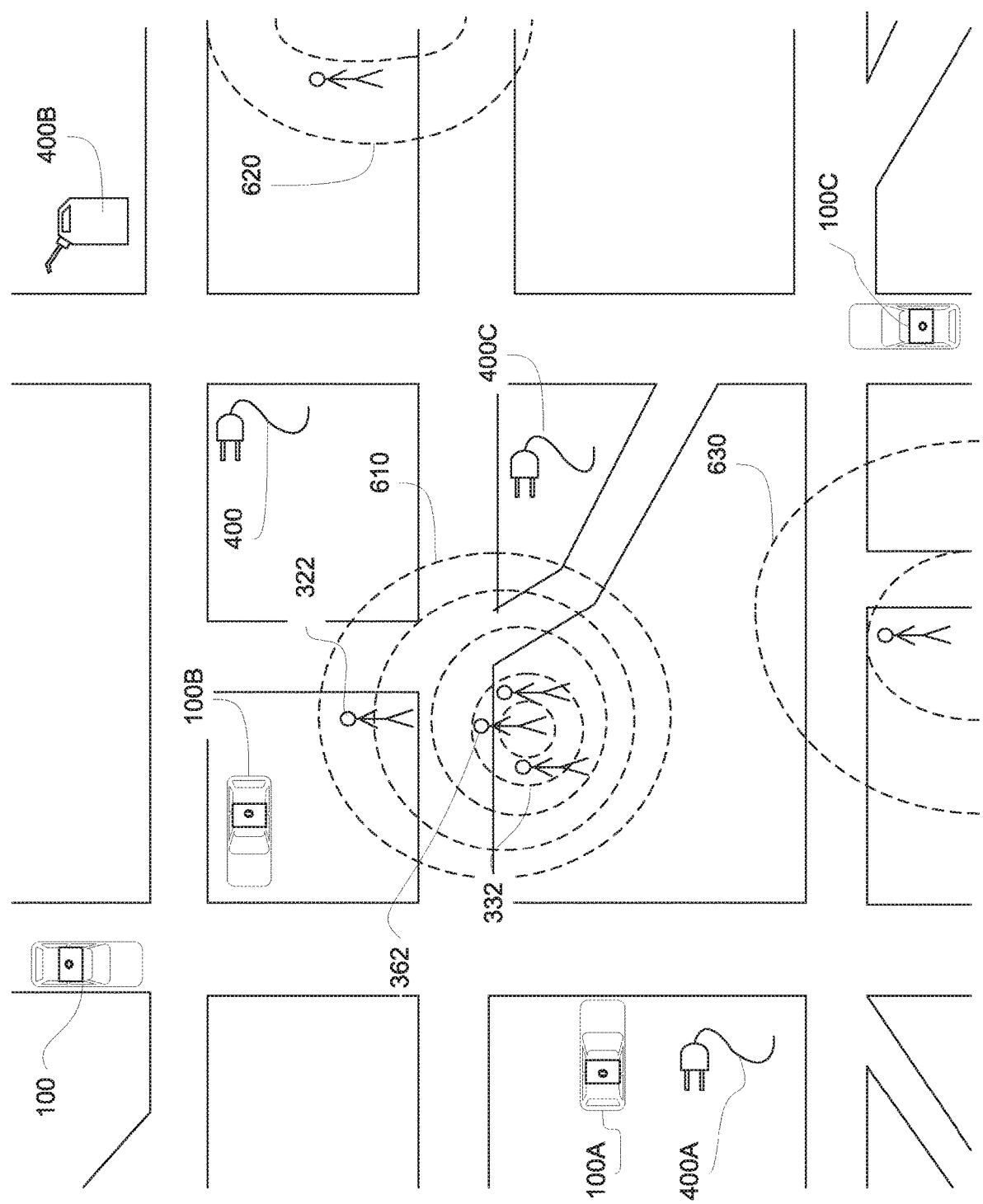
FIG. 6 is an example representation of data in accordance with aspects of the disclosure.

The demand data may indicate current aod/or expected demand for trips by the vehicles of the fleet. For example, the demand data may include current demand for service, or in other words, the number of trips that re currently in progress or being requested by users. FIG. 5C shows some example current demand data in a table 500C that may be sent from users 322, 332, 342, 352. The demand data may specify service type requested, for example, service type for users 322, 332, and 342 is taxi, service type for user 352 is car pool. The demand data may further specify a number of passengers requesting the trip, for example, user 322 is requesting a trip for four passengers, user 332 is requesting a trip for one passenger, while users 342 and 352 are each currently on a trip with another passenger. The demand data may include pickup locations and destination locations, for example, user 322's pickup location is [x10, y10], and destination is [x11, y11], user 352's carpool trip has two pickup locations [x16, y16], [x18, y18], as well as two destinations [x17, y17], [x19, y19]. The demand data may also specify the vehicle type requested, for example, user 322 requested an electric autonomous sedan, user 332 requested a hybrid semi-autonomous minivan, user 342 is on a trip in an electric semi-autonomous compact vehicle, and user 352 is on a trip in a fuel cell autonomous compact vehicle. The demand data may be a map indicating distribution of low and high demand locations within areas serviced by the fleet. As shown in FIG. 6, a map 600 shows the demand distribution indicated by dotted concentric circles 610, 620, 630, the dotted concentric circles 610 that re more closely spaced indicate higher demand than the dotted concentric circles 620, 630 that are less closely spaced. Instead of concentric circles, the demand variations may be shown on the map in any of a number of ways, for example, by different colors or symbols. Although not shown in the figures, the demand data may also include predictions of future demand for trips, such as in the next 10 min, next 30 min, next hour, or for a particular time on a particular day. Current and/or future demand data may be predicted based on historical data collected for similar times and days.

The storage system 350 may also store map information for the areas that the fleet serves, which may include road conditions (e.g. width, angle of turn, elevations, number of lanes), traffic rules (e.g., one way, traffic lights, stop signs, speed limits, no U-turn), and information on various establishments (e.g., parking lots, restaurants, gas stations). The storage system 350 may overlay or otherwise cross-reference the vehicle data, the charger data, and the demand data with respect to the map information. The storage system 350 may further store information collected, received, or retrieved from external sources, for example, weather reports from weather stations, energy cost and demand information from energy providers, updated traffic conditions from local news, etc.

The server computing devices 310 may also store heuristics, such as those discussed further below, which can be used to determine tasks for vehicles of the fleet. These heuristics may be designed and fine-tuned to optimally mage the fleet. For example, certain thresholds in the example heuristics described below may be manually adjusted based on actual or expected demand for vehicle services. For another example, the various thresholds and heuristics may be automatically adjusted, such as automatically decreasing target charging levels in response to a real-time increase in demand or increasing target charging levels in response to a real-time decrease in demand. As such, a model may be used to adjust certain heuristics in order to automatically respond to challenges in demand.

In order to provide transportation services to users, the information of storage system 350 may include user account information such as credentials (e.g., a username and password as in the case of a traditional single-factor authentication as well as other types of credentials typically used in multi-factor authentications such as random identifiers, biometrics, etc.) that can be used to identify a user to the one or more server computing devices. The storage system 350 may also store information which can be provided to client computing devices for display to a user.

Example Methods

In addition to the systems described above and illustrated in the figures, various operations will now be described. It should be understood that the following operations do not have to be performed in the precise order described below. Rather, various steps can be handled in a different order or simultaneously, and steps may also be added or omitted.

In one aspect, the server computing devices 310 may be configured as a dispatch system that determines a next vehicle task for a vehicle in a fleet based on vehicle data, charger data, and demand data. In order to do so, the server computing devices 310 may be receive vehicle data, charger data, and demand data. The vehicle data may be sent from the computing devices of the vehicles. For example, referring to FIGS. 1 and 5A, computing devices 110 of vehicle 100 may have its vehicle type saved in data 134 of memory 130, such as that it is an electric autonomous sedan having a passenger capacity of five, and send the vehicle type to the server computing devices 310. Computing devices 110 of vehicle 100 may also have charge status of 50% and charge capacity of 90 kWh saved in data 134 of memory 130. Computing devices 110 of vehicle 100 may be in communication with positioning system 170, which determines the vehicle location [x1, y1], the vehicle location may be saved in data 134 of memory 130. For another example, computing devices 110 of vehicle 100 may also have the current vehicle task, on a carpool trip with four passengers and two destinations saved in data 134 of memory 130. Computing devices 110 may update each of these vehicle data in data 134 of memory 130 as they change, and send them to the server computing devices 310 periodically or upon request.

The charger data may be sent from the computing devices of the chargers. For example, referring to FIGS. 4 and 5B, charger 400 may have its location [x5, y5], that it is an electric, Level 2 charger with automated connectors, and that its 9 am-10 pm hours of operation saved as data in its memory. The charger 400 may also store its availability information as data in its memory, and update as the status changes. The charger 400 may update each of these charger data in its memory as they change, and send them to the server computing devices 310 periodically or upon request.

The demand data may be sent from the user computing devices. For example, referring to FIGS. 4 and 5C, user 322 may enter a new trip request using user input devices 326 of client computing device 320, client computing device 320 then sends the trip request to server computing devices 310. The client computing device 320 may send updates on the request to the server computing devices 310, for example, if user 322 is on the trip or if the trip is eventually completed. The server computing devices 310 may aggregate requests from many users to determine a current distribution of high and low demand areas or make projections of future distribution of high and low demand areas. The server computing devices 310 may use past demand data to build a future demand model based on parameters such as date and time. The server computing devices 310 may use triangulating signals, such as traffic on the road or events in the area, to predict future demand. The server computing devices 310 may also use pre-demand signals, such as the number of people opening a trip-requesting app, to predict future demand.

The server computing devices 310 may store the vehicle data, the charger data, and the demand data in data 134 of memory 130 in the storage system 350. When the server computing devices 310 receives new vehicle data, for example, a new vehicle location is received from vehicle 100, the server computing devices 310 may update the corresponding vehicle location for vehicle 100 in the storage system 350. If the server computing devices 310 receives new charger data, for example, charger 400 sends an updated availability status as out of service, the server computing devices 310 may update the corresponding charger availability for charger 400 in the storage system 350. Similarly, if the server computing devices 310 receive a new trip request, for example from user 332, the server computing devices 310 may add the new trip request in the storage system 350.

The vehicle data, the charger data, and the demand data may be sent to and/or updated the server computing devices upon request, or may be sent to the server computing devices periodically, for example, every minute. As another example, the vehicle data may be sent to the server computing devices each time the vehicle completes a trip.

The server computing devices 310 may make predictions using the vehicle data of the storage system 350. For instance, the server computing devices 310 may make a prediction or estimate for an energy consumption rate of a vehicle, such as any of vehicles 100, 100A-100C, expressed either on a per-mile and/or a per-hour basis. For instance, referring to FIG. 5A, the energy consumption rate for a given vehicle may be determined by the vehicle type of the given vehicle. As some examples, an electric vehicle may consume energy faster the a hybrid vehicle; a minivan may consume energy faster than a compact vehicle; and an autonomous vehicle may consume energy faster than a semi-autonomous vehicle, etc. For another instance, the energy consumption rate may be determined by the current vehicle task. As some examples, a vehicle that is idling, such as vehicle 100C, may consume energy slower than while it was servicing a trip; a vehicle that is serving a car pool, such as vehicle 100, may consume energy faster than when it was serving as a taxi; a vehicle that has four passengers onboard, such as vehicle 100, may consume energy faster than when it only had one passenger onboard, etc. The server computing devices 310 may further predict energy consumption rate based on predicted fraction of time that a vehicle would likely be driving as compared to idling.

In addition to the vehicle data of storage system 350, the server computing devices 310 may also use other factors to predict the energy consumption rate of a vehicle. For example, a vehicle may consume energy faster or slower depending on route conditions, such as variations in elevations and number of turns. As another example, complex routes may require more computations for autonomous and semi-autonomous vehicles, such as vehicles 100, 100A, 100C, thereby increasing the energy consumption rate. Such route conditions may be detected by the perception system 172 in communication with computing devices 110 of the vehicle, or determined using the map information stored in the navigation system 168 in communication with the computing devices 110 of the vehicle, or the map information stored in the storage system 350. As yet another example, weather conditions may impact the energy consumption rate of the vehicle, as HVAC and heating may be required. Such weather conditions may be detected the perception system 172 in communication with the computing devices 110 of the vehicle, or retrieved by the server computing devices 310 from a weather station. The server computing devices 310 may also predict a likelihood that a user may modify a trip, which may further impact the energy consumption rate.

The server computing devices 310 may also use the vehicle data of the storage system 350 to predict when a vehicle will likely run out of charge. For instance, using the predicted energy consumption rate as described above, the vehicle charge status, and the vehicle charge capacity, the server computing devices 310 may predict when the vehicle will likely run out of charge. For example, if the predicted energy consumption rate for a vehicle is 0.3 kWh/mile for vehicle 100 of FIG. 5A, the vehicle charge status is 50% charged, and the vehicle charge capacity is 90 kWh, then the server computing devices 310 may predict that the vehicle will likely run out of charge in the next 150 miles.

The server computing devices 310 may also predict a future vehicle charge status after a vehicle has or will have completed a trip. For instance, this prediction may be made using each of the predicted energy consumption rate, the vehicle charge status, and the vehicle charge capacity for a given vehicle as well as either a distance or a duration of the trip. For example, if the predicted energy consumption rate is 0.3 kWh/mile for vehicle 100 of FIG. 5A, the vehicle charge status currently is at 50% charged, the vehicle charge capacity is 90 kWh, and there is 30 miles remaining for the current trip, then the server computing devices 310 may predict that, by the end of the trip, the vehicle charge status is likely 40% charged.

The server computing devices 310 may also use the vehicle data of storage system 350 to predict a location of a vehicle after the vehicle completes a task, such as a trip. For instance, the vehicle location after a trip may be predicted using the current vehicle task. For example, if a vehicle, such as vehicle 100 of FIG. 5A, is completing a carpool trip with two destinations, the vehicle location after the vehicle task would likely be one of the two destinations of the carpool. The server computing devices 310 may further determine which of the two destinations of the carpool would likely be the final destination, for example, based on a sequence that produces the shortest traveling time. For another example, if the vehicle is on route to recharge, the vehicle location after the vehicle task would likely be the nearest charger.

In addition to using the vehicle data, the server computing devices 310 may also make predictions based on the charger data of storage system 350. For instance, the server computing devices 310 may determine a charger's future availability based on the charger's current availability, the charger type, and the charger speed. For example, if a charger, such as charger 400A of FIG. 5B, is temporarily unavailable as the charger 400A is in use by another vehicle, and the charger is a Level 3 fast electrical charger which will fully charge vehicle 100A in 30 minutes, the server computing devices 310 may predict that charger 400A will be available after 30 minutes or rather, at a time 30 minutes into the future. For another instance, the server computing devices 310 may predict a distance between a vehicle, such as vehicle 100 of FIG. 5A, and an available charger, such as charger 400A of FIG. 5B, at a future time, for example 30 minutes from now, based on the charger location ([x6, y6]), the predicted future charger availability (available in 30 min), and the predicted vehicle location 30 minutes from now (final destination of the car pool).

Similarly, the server computing devices 310 may also make predictions based on the demand data of storage system 350. For another instance, the server computing devices 310 may predict a wait-time based on the demand data, the locations of the vehicles of the fleet, and the current vehicle tasks of various vehicles in the fleet. For example, referring again to FIG. 6, if three users 322, 332, and 362 are requesting a trip as shown near the center of the map, and the system determines that, within a 5-mile radius, vehicle 100 is currently completing a trip that will reach the destination in 10 minutes, and from that destination it will take 5 minutes to reach one of users 322, 332, or 362, vehicle 100A is charging, which will complete in 5 minutes, and it will take 2 minutes to reach one of users 322, 332, or 362, and vehicle 100C is idle and ca drive immediately to reach one of users 322, 332, or 362 in 5 minutes, the server computing devices 310 may determine the likely wait-times for each of the 3 requesting users after selecting the suitable trip for each user based on heuristics discussed in detail below (for example, user 322 may be requesting a vehicle type that matches vehicle 100, user 332 may be requesting a vehicle type that matches vehicle 100A, and user 362 may be requesting a trip that ends near a suitable charger for vehicle 100C). For example, user 322 will have a predicted wait-time of 15 min for vehicle 100, user 332 will have a predicted wait-time of 7 min for vehicle 100A, and user 362 will have a predicted wait-time of 5 min for vehicle 100C.

The server computing devices 310 may use the vehicle data, the charger data, and the demand data of storage system 350, in combination with the predictions and heuristics of storage system 350 to determine a next vehicle task for a vehicle. Again, the vehicle tasks may include, but re not limited to, recharging, continuing to recharge, stopping recharging, powering off, or servicing a next trip. As an example, for any given set of vehicle data for a particular vehicle, charger data, demand data and predictions, the server computing devices 310 may use the heuristics to determine whether the particular vehicle should next recharge, continue to recharge, stop recharging, service a next trip, or power off.

At least some of these heuristics may be used to determine when a vehicle should next recharge. For example, the server computing devices 310 may use a heuristic that identifies a threshold absolute minimum level such that a vehicle must be directed to recharge once the threshold absolute minimum level is reached. Referring to FIGS. 5A, 5B, and 6, vehicle 100C is idling with only 10% fuel, if the threshold absolute minimum level is set at 20%, the server computing devices 310 may direct vehicle 100C to drive to an available charger, such as charger 400C, to be recharged. Such a heuristic requiring vehicles of the fleet to not drive with very low fuel may increase safety because this gives the vehicles a margin to handle unexpected situations, for example, if a vehicle only has 10% fuel left and needs 8% of the fuel to drive to a charger, but encounters traffic congestion on the way to the charger, the unexpected delay may be enough to cause the vehicle to run out of charge in the middle of the road. As another example charge heuristic, referring to FIGS. 5A, 5B, and 6, if the server computing devices 310 determines that an electrical sedan in the fleet, such as vehicle 100, is 50% charged and is currently servicing a trip that will complete in the next 5 minutes, an electrical charger, such as charger 400, within 1 mile radius from the destination of the trip is likely available in 5 minutes, and that the demand for service is likely below a low demand threshold in the next 5 minutes, the heuristic may require that the vehicle 100 to recharge at the charger 400 after completing the current trip.

Figure 7:
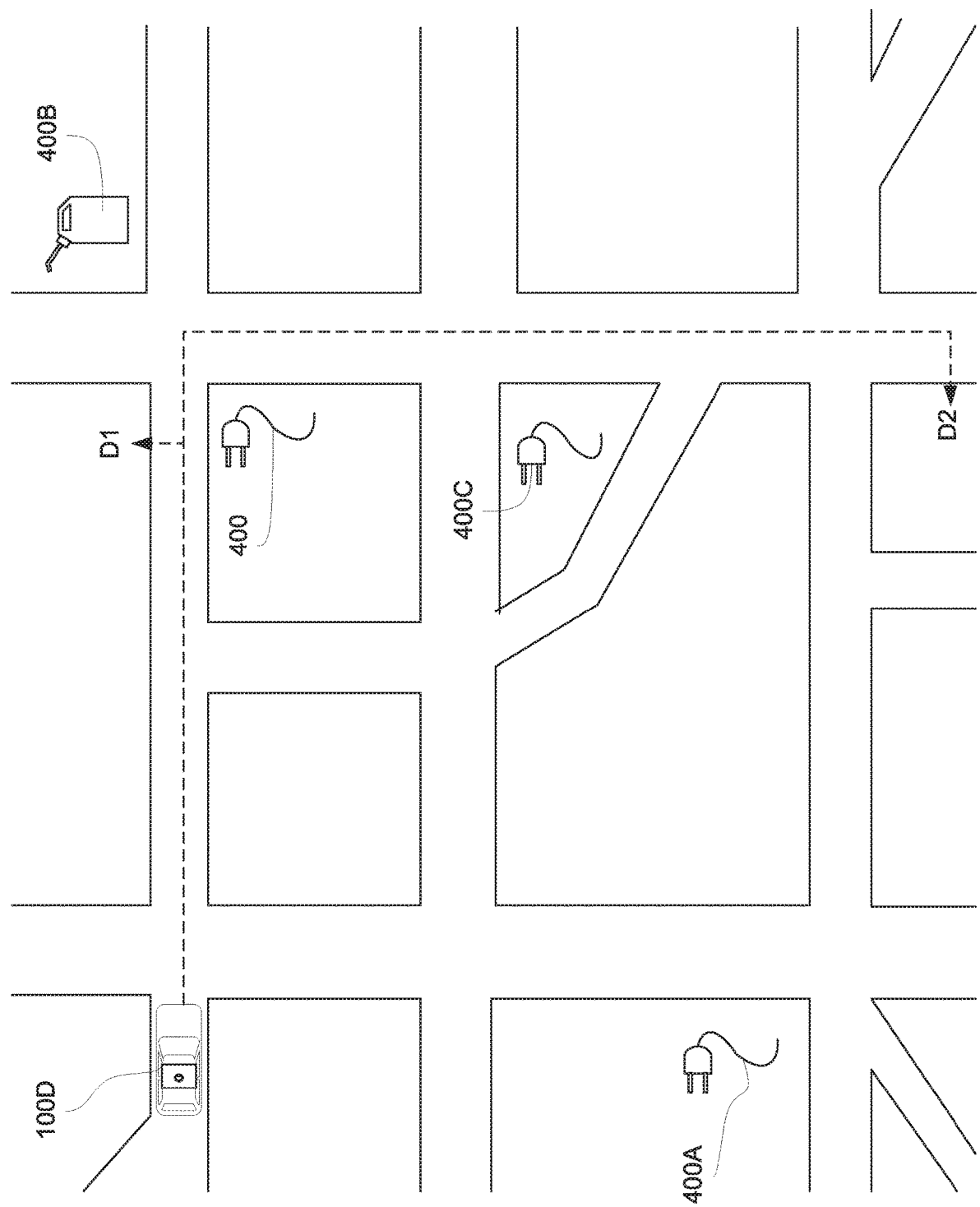
FIG. 7 is an example representation of data in accordance with aspects of the disclosure.

In still other embodiments, heuristics may be designed to select or identify a suitable charger, if the next vehicle task is determined to be recharging. For example, the server computing devices 310 may determine distances between the vehicle and various chargers based on the vehicle location and the charger locations, and a heuristic may select the closest available charger as the suitable charger. Referring to FIG. 7, map 700 shows that charger 400 would be the closest available charger for vehicle 100D. Another heuristic may select a suitable charger based on compatibility determined from the vehicle type and the charger type. Referring to FIG. 7 again, electrical vehicle 100D is compatible with chargers 400 and 400A.

In addition, when identifying a charger for a particular vehicle, the server computing devices 310 may also consider needs of other vehicles in the fleet to recharge. In this regard, a heuristic may require that vehicles in the fleet to charge at chargers in different locations so that load-balance may be achieved, thereby avoid causing congestion or a price surge in certain locations. For example, areas serviced by the fleet may be segmented into various zones, and a heuristic may require that the number of vehicles charging at a given time in each zone is below a threshold number for that zone, where the threshold number may be determined based on the energy pricing in that zone at the given time.

In addition to determining a next vehicle task of charging, heuristics may be designed to determine an extent to recharge the vehicle. The server computing devices 310 may use a heuristic that identifies a threshold maximum level of recharge and a threshold minimum level of recharge. For example, the threshold maximum level of recharge may be determined based on the vehicle charge status, the vehicle charge capacity, and the charger speed. For instance, charging may be much faster for the vehicle from 0-80% than from 80-100%. Thus, a heuristic may identify the threshold maximum level of recharge as 80% so as to avoid inefficiencies, for example, vehicle 100A of FIG. 5A would be required to stop charging once 80% is reached. For another example, a heuristic may identify an adjusted threshold maximum level based on demand data (e.g. 50%), so that during times where demand is above a threshold peak demand, the heuristic may require that the vehicle to never charge above the adjusted threshold maximum level so as to better meet demands. On the other hand, the threshold minimum level of recharge may be identified by a heuristic based on, for example, a cost for the vehicle to travel from a previous location to the charger, such that heuristic requires a vehicle to continue charging until the extent of recharge at least justifies the cost. As yet another example, a heuristic may allocate an extent to recharge the vehicle now as compared to at a later time based on a comparison of current energy cost and predicted future energy cost.

As noted above, heuristics may be used to determine whether a vehicle should continue recharging or stop recharging if the vehicle is currently charging. For example, if a vehicle, such as vehicle 100A, is currently at a charger and is recharged to 70%, and the server computing devices 310 determines that demand is below a low demand threshold for a hybrid semi-autonomous vehicle within a 5 mile radius of the location of vehicle 100A, then a heuristic may require that vehicle 100A to continue recharging. For another example, if a vehicle, such as vehicle 100A, is currently at a charger and is recharged to 70% when the server computing devices 310 determines that demand is surging above a high demand threshold for a hybrid semi-autonomous minivan within a 5 mile radius of the location of vehicle 100A, a heuristic may require vehicle 100A to slop recharging and to service a trip, even if at that point vehicle 100A is not fully charged.

The heuristics may also be used to determine whether a vehicle should power off. For example, referring to FIGS. 5A and 6, vehicle 100 is currently servicing a trip with 50% charge remaining. If vehicle 100 completes the trip with 45% remaining charge, but the server computing devices 310 determine that the demand is below a low demand threshold, and that no chargers are within 1 mile radius from vehicle 100, a heuristic may require the vehicle 100 to park and power off to conserve energy. In some embodiments, the heuristics may dictate whether a next task for a particular vehicle will be recharging now or after a next trip. Such heuristics may depend upon whether the particular vehicle will be closer to an available charger upon completing the current trip than upon completing the next trip. FIG. 7 shows an electrical vehicle 100D that is on a current trip ending at D1, and after the first trip, is directed to serve a next trip ending at D2. For example, even if the server computing devices 310 determines that vehicle 100D is unlikely to run out of fuel during the next trip ending at D2, a heuristic may require vehicle 1000 to recharge after the current trip ending at D1, when the vehicle 100D is likely closer to ma available electrical charger, charger 400, than after the next trip ending at D2.

Figure 8:
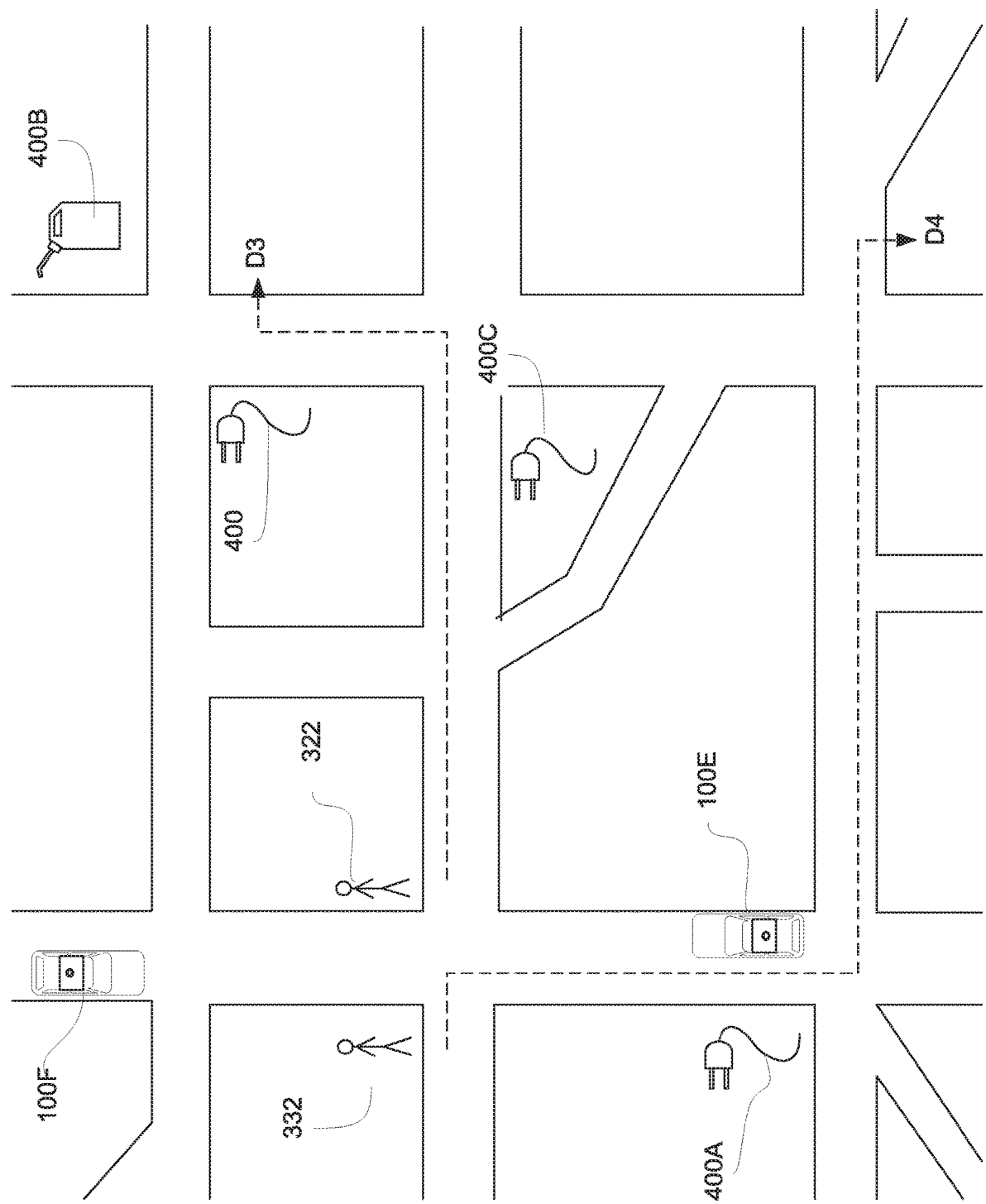
FIG. 8 is an example representation of data in accordance with aspects of the disclosure.

The server computing devices 310 may have a heuristic for selecting a suitable next trip for a vehicle based on the destination of the trip requests so that, if the vehicle needs to be recharged soon, it may be directed to serve a trip whose destination is near ma available charger. Referring to FIG. 8, map 800 shows that user 322 requests a trip with destination D3 and user 332 requests a trip with destination D4. Vehicles 100E and 100F me both available to serve users 322 and 332. However, while vehicle 100E is only 20% charged and therefore needs to be charged soon, vehicle 100F is fully charged and therefore does not need to be charged any time soon. Thus, although both vehicles could serve either users 322 or 332, the server computing devices 310 may have a heuristic that selects the trip requested by user 322 as the suitable trip for vehicle 100E so that vehicle 100E will be closer to charger 400 after completion of the trip at D3.

The server computing devices 310 may further use heuristics to determine whether a trip is a suitable next trip based on the demand data. For example, a heuristic may be designed to choose between two vehicles in the fleet such that the final location of each vehicle upon trip completion is closer to predicted high-demand areas. The server computing devices 310 may further use heuristics to determine whether a trip is suitable based on the energy cost. For example, a heuristic may prioritize electrical vehicles to service trips during time windows where coat of electricity is high and allow the electrical vehicles may recharge outside of hours with peak energy costs.

Figure 9:
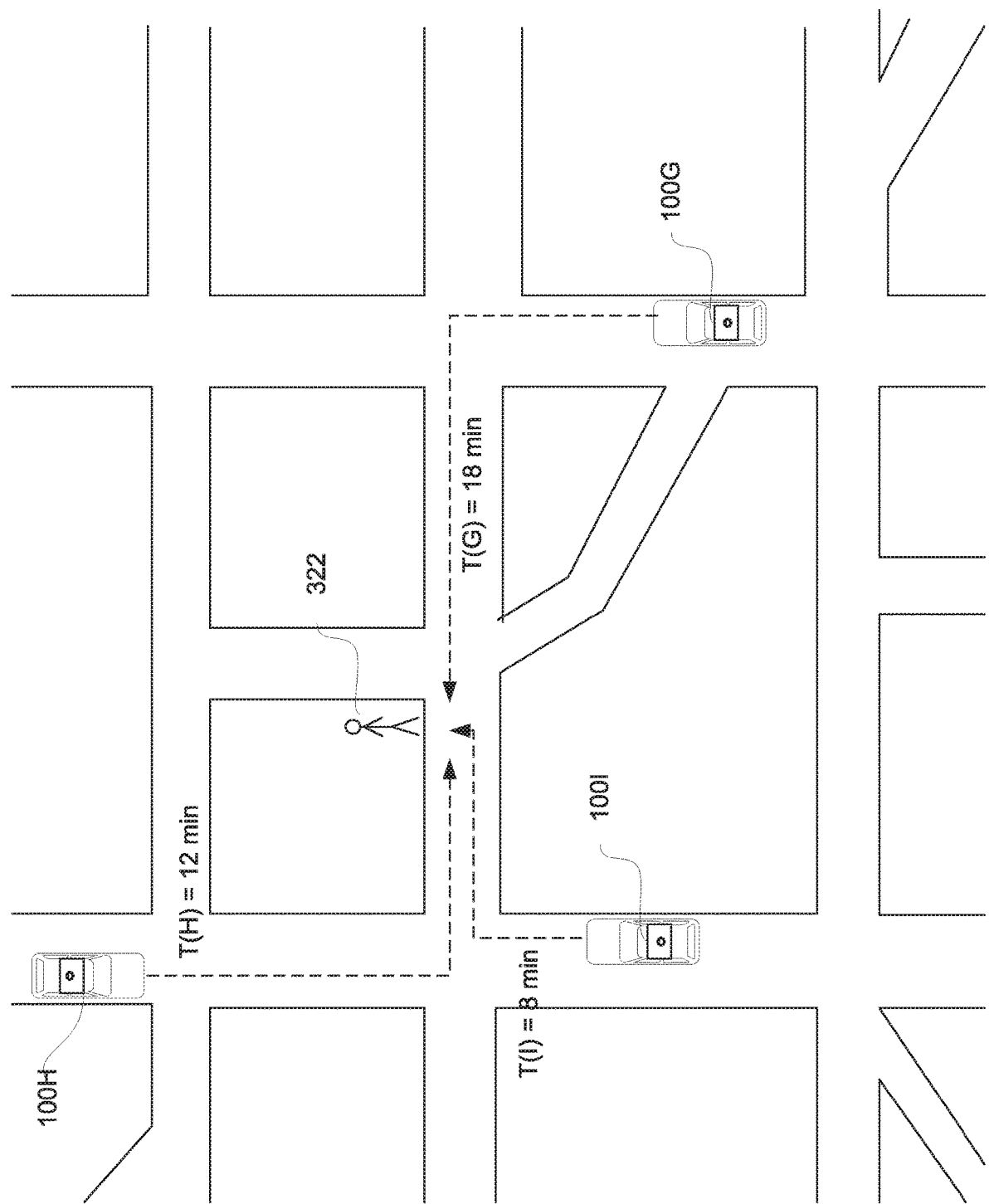
FIG. 9 is an example representation of data in accordance with aspects of the disclosure.

The server computing devices 310 may also use heuristics to determine a suitable next trip based on the predicted wait-time. For example, a heuristic may identify a maximum threshold wait-time such that, if the predicted wait-time exceeds the maximum threshold wait-time (e.g. 10 min), the heuristic may require swapping another vehicle in the fleet with a shorter predicted wait-time to service the trip. Referring to FIG. 9, map 900 shows various vehicles 100G, 100H, 100I, and a requesting user 322. If vehicle 100G was initially directed to serve a request made by user 322, which has a predicted wait-time T(G) of 18 minutes and therefore above the maximum threshold wait-time of 10 minutes. Then 1 minute later, vehicle 100H becomes available at a location closer to user 322 than vehicle 1000, with a predicted wait-time T(H) of 12 minutes. Thus, the heuristic may require vehicle 100H to be swapped with vehicle 100G to serve the request made by user 322, which would save 5 minutes of waiting for the user 322. As another example, a heuristic may identify man urgent trip threshold such that, if swapping the vehicles only saves the requesting user an amount of time less than the urgent trip threshold (e.g., 5 min), the heuristic would not require swapping the vehicles. Again referring to FIG. 9, suppose 1 minute after vehicle 100H was swapped with vehicle 1000 to serve the trip requested by user 322, vehicle 100I becomes available at an even closer location than vehicle 100H, with a predicted wait-time T(I) of 8 minutes. However, swapping vehicle 100I for vehicle 100H would only save 3 minute of waiting for user 322, which is below the urgent trip threshold of 5 minutes. Therefore, the heuristic will not require swapping vehicle 100I with vehicle 100H. Instead, the server computing devices 310 may find another suitable next trip for vehicle 100I.

Some heuristics may be designed based on prediction of energy cost. For example, if the vehicle is in a jurisdiction that sets energy cost for certain types of energy (e.g., electricity) based on demand, a heuristic may require vehicles that uses this type of energy (e.g., vehicles 100, 100A) to only charge outside of certain peak hours (e.g., outside of 6 pm-8 pm). For example, referring to FIG. 6, if the server computing devices 310 predicts that peak hours are ending soon, a heuristic may require vehicle 100A to stop charging, and have both vehicles 100 and 100A wait until ater the peak hour ends to recharge. Conversely, if the server computing devices 310 predicts that peak hour is coming up soon, the same or another heuristic may require that vehicle 100 to recharge before the peak hour, instead of servicing a next trip, even if vehicle 100 has enough remaining charge to service the next trip. Where an energy storage system is available, a heuristic may require vehicles to charge only at the energy storage during peak hours.

In other embodiments, one heuristic may be to only allow a vehicle to serve a trip if it is predicted that the vehicle is likely to have sufficient charge at the end of the trip to drive to a charger. Referring to FIGS. 5A and 6, vehicle 100C is only 10% charged, so the heuristic may require vehicle 100C to serve only a very short trip that would leave vehicle 100C enough charge afterwards to travel to a charger for recharge, for example, picking up and dropping off a passenger an the way to charger 400C. For another example, the server computing devices 310 may have a heuristic that prioritizes vehicles having low charge status for shorter trips. For another example, the server computing devices 310 may use heuristics to determine whether a trip is suitable for the vehicle based on the vehicle type, the service type, ad the number of passengers. Referring to FIGS. 5A and 5C, the trip requested by user 322 would be suitable for vehicle 100, and the trip requested by user 332 would be suitable for vehicle 100A. The server computing devices 310 may also use heuristics to determine whether a trip is suitable based on the vehicle charge status, the vehicle charge capacity, and the trip distance.

Heuristics may also be designed as fleet-wide rules for identifying next tasks, rather than specific to individual vehicles. For example, the server computing devices 310 may monitor the states of all the vehicles of the fleet and all the heuristics—fleet-wide and individual, and adjust the individual vehicle tasks and the individual heuristics according to fleet-wide goals set by fleet-wide heuristics. For example, to save energy, a heuristic may require a staggered start time for the fleet. For another example, a heuristic may require that vehicles in the fleet to recharge before peak demand hours such that, during peak demand hours, a minimum mileage capacity across the fleet may be maintained to minimize lost trips.

Although the examples above relate to using heuristics to determine vehicle tasks, these tasks may be determined using various machine learning techniques. For example, the server computing devices 310 may have a reinforcement-learned simulation optimized for overall efficiency of the fleet. The machine-learned method on the server computing devices 310 may be a regression model or a classification model, and may further be a linear model, a boosting tree model, a random forest model, or a neural net model. The model may be built using data from past trips as training data to solve optimization functions that aims to, for example, minimize empty miles driven by the fleet, minimize wait times of users, and minimize energy costs. Alternatively, the model could be built using a simulator which measures and optimizes the outcomes.

Figure 10:
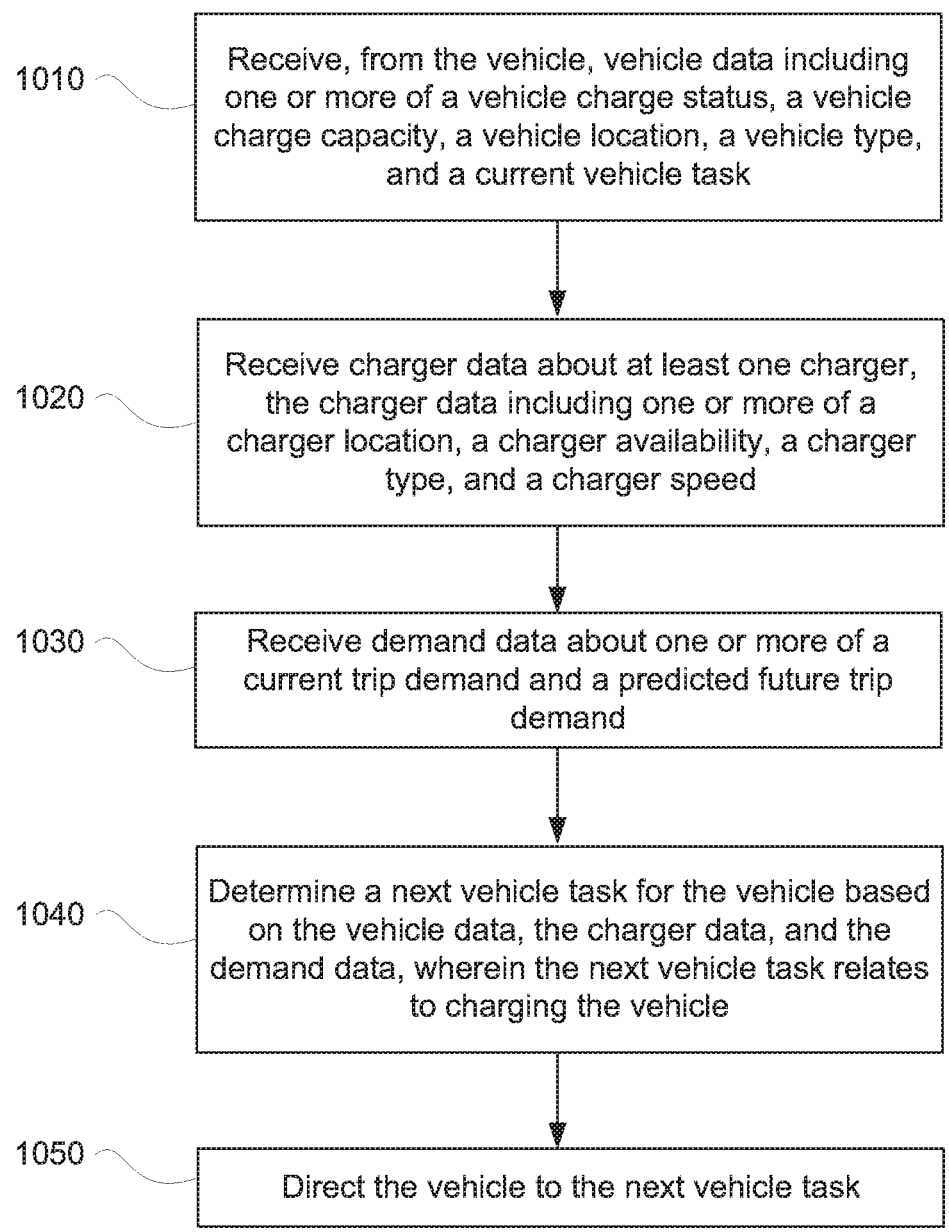
FIG. 10 is an example flow diagram in accordance with aspects of the disclosure.

FIG. 10 includes an example flow diagram 1000 of some of the examples for managing a fleet of vehicles as discussed above. In this example, the steps of the flow diagram may be performed by one or more processors of one or more computing devices, such as processors of server computing devices 310. At block 1010, vehicle data about a vehicle in a fleet is received from the vehicle, the vehicle data including one or more of a vehicle charge status, a vehicle charge capacity, a vehicle location, a vehicle type, and a current vehicle task. At block 1020, charger data about at least one charger is received, the charger data including one or more of a charger location, a charger availability, a charger type, and a charger speed. At block 1030, demand data is received about one or more of a current trip demand and a predicted future trip demand. At block 1040, a next vehicle task for the vehicle is determined based on the vehicle data, the charger data, and the demand data, wherein the next vehicle task relates to charging the vehicle. At block 1050, the vehicle is directed to the next vehicle task.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples me intended to illustrate only one of many possible embodiments. Further, the same reference numbers in different drawings can identify the same or similar elements.

The invention claimed is:

1. A method of determining a next vehicle task for a vehicle of a fleet to perform, the method comprising:
   receiving, by one or more processors of one or more server computing devices, from the vehicle, vehicle data including a vehicle charge status and a vehicle charge capacity;
   receiving, by the one or more processors, from one or more computing devices of one or more chargers, charger data including one or more of charger location data, charger availability status, charger type or charger speed;
   receiving, by the one or more processors, from one or more user computing devices, demand data about one or more of a current trip demand or a predicted future trip demand;
   determining, by the one or more processors, the next vehicle task for the vehicle to perform based on the vehicle data, the charger data, the demand data and one or more fleet-wide heuristics that define a respective threshold number of vehicles recharging at a given time in respective zones established for the fleet, wherein the next vehicle task relates to recharging the vehicle;
   determining, by the one or more processors, an extent to recharge the vehicle based on at least one of the vehicle data or the charger data; and
   directing, by the one or more processors, the vehicle to perform the next vehicle task,
   wherein the directing causes the vehicle to drive to a location of an available charger according to the charger data and using the available charger to recharge the vehicle up to the determined extent to recharge the vehicle, and
   wherein the determined extent to recharge the vehicle is further based on whether the vehicle charge status exceeds a threshold maximum level.

2. The method according to claim 1, further comprising:
   determining an energy consumption rate of the vehicle; and
   predicting a future vehicle charge status after a trip based on the energy consumption rate,
   wherein directing the vehicle to perform the next vehicle task includes directing the vehicle to recharge after the trip when the predicted future vehicle charge status after the trip is below a threshold minimum level.

3. The method according to claim 2, wherein the energy consumption rate for the trip is determined further based on weather conditions.

4. The method according to claim 1, further comprising:
   determining whether the vehicle charge status is below a threshold absolute minimum level,
   wherein directing the vehicle to perform the next vehicle task includes directing the vehicle to recharge when the vehicle charge status is determined to be below the threshold absolute minimum level.

5. The method according to claim 1, further comprising:
   predicting a likelihood that an energy cost for recharging the vehicle at the given time will be lower than an energy cost for recharging the vehicle at a future time,
   wherein determining the next vehicle task is further based on the likelihood that the energy cost for recharging the vehicle at the given time will be lower than the energy cost for recharging the vehicle at a future time.

6. The method according to claim 1, further comprising:
   determining one or more time windows with peak energy costs during which recharging of the vehicle is not performed.

7. The method according to claim 1, further comprising:
   selecting a suitable charger amongst the one or more chargers for recharging the vehicle,
   wherein the vehicle recharges using the suitable charger.

8. The method according to claim 7, wherein selecting the suitable charger is further based on needs of other vehicles in the fleet to recharge.

9. The method according to claim 7, wherein selecting the suitable charger is further based on a distribution of where other vehicles in the fleet are recharging.

10. The method according to claim 7, further comprising:
    predicting a future charger availability based on availability, type, and speed of the suitable charger,
    wherein selecting the suitable charger is based on the future charger availability.

11. The method according to claim 1, further comprising:
    determining, by the one or more processors, an extent to recharge the vehicle based on whether the vehicle charge status exceeds a threshold maximum level; and
    adjusting, by the one or more processor, the threshold maximum level when the current trip demand is above a threshold peak demand,
    wherein determining the extent to recharge the vehicle is further based on whether the vehicle charge status exceeds the adjusted threshold maximum level.

12. The method according to claim 1, further comprising:
determining, by the one or more processors, an extent to recharge the vehicle based on whether the vehicle charge status falls below a threshold minimum level, wherein the threshold minimum level is based on a cost of traveling involved to reach a charger for recharge.

13. The method according to claim 1, further comprising:
determining, by the one or more processors, an extent to recharge the vehicle based on a comparison between a current energy cost and a predicted future energy cost.

14. The method according to claim 1, further comprising:
determining a suitable next trip based on at least one of a vehicle type, a service type, or a number of passengers, wherein the vehicle services the suitable next trip and recharges after the suitable next trip.

15. The method according to claim 14, further comprising:
predicting a first vehicle location after a current vehicle task is performed;
predicting a second vehicle location after a next trip based on the demand data; and
predicting a likelihood that the vehicle will be closer to an available charger upon completing the current vehicle task than upon completing the next trip,
wherein determining the next vehicle task is further based on the likelihood that the vehicle will be closer to the available charger upon completing the current vehicle task than upon completing the next trip.

16. The method of claim 1, wherein the respective threshold number is based on energy pricing for the respective zones at the given time.

17. The method according to claim 1, wherein the demand data further specifies a vehicle type and a number of passengers requested for a trip by each of a plurality of users.

18. The method according to claim 17, wherein the demand data further specifies a service type requested by each of the plurality of users.

19. The method according to claim 18, wherein the service type is a taxi service.

20. The method according to claim 18, wherein the service type is a carpool service.

21. A system for determining a next vehicle task for a vehicle of a fleet to perform, the system comprising:
the vehicle; and
one or more processors of one or more server computing devices, the one or more processors being configured to:
receive vehicle data about the vehicle in the fleet, the vehicle data including a vehicle charge status and a vehicle charge capacity;
receive, from one or more computing devices of one or more chargers, charger data including one or more of charger location data, charger availability status, charger type or charger speed;
receive, from one or more user computing devices, demand data about one or more of a current trip demand or a predicted future trip demand;
determine the next vehicle task for the vehicle to perform based on the vehicle data, the charger data, the demand data and one or more fleet-wide heuristics that define a respective threshold number of vehicles recharging at a given time in respective zones established for the fleet, wherein the next vehicle task relates to recharging the vehicle;
determine an extent to recharge the vehicle based on at least one of the vehicle data or the charger data; and
direct the vehicle to perform the next vehicle task relating to charging the vehicle,
wherein, in response to the one or more processors directing the vehicle to perform the next vehicle task, the vehicle drives to a location of an available charger according to the charger data and using the available charger to recharge the vehicle up to the determined extent to recharge the vehicle, wherein the determined extent to recharge the vehicle is further based on whether the vehicle charge status exceeds a threshold maximum level.

22. The system of claim 21, wherein the one or more processors are further configured to:
determine an energy consumption rate of the vehicle; and
predict a future vehicle charge status after a trip based on the energy consumption rate, and
wherein directing the vehicle to perform the next vehicle task includes directing the vehicle to recharge after the trip when the predicted future vehicle charge status after the trip is below a threshold minimum level.

* * * * *